US011279409B2

(12) United States Patent
Shimizu (10) Patent No.: US 11,279,409 B2
(45) Date of Patent: Mar. 22, 2022

(54) VEHICLE FRONT PORTION STRUCTURE

(71) Applicant: Toyota Jidosha Kabushiki Kaisha, Toyota (JP)

(72) Inventor: Kazuki Shimizu, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 431 days.

(21) Appl. No.: 16/503,858

(22) Filed: Jul. 5, 2019

(65) Prior Publication Data

US 2020/0047811 A1 Feb. 13, 2020

(30) Foreign Application Priority Data

Aug. 7, 2018 (JP) .............................. JP2018-148344

(51) Int. Cl.
| | |
|---|---|
| *B60J 7/00* | (2006.01) |
| *B62D 21/15* | (2006.01) |
| *B62D 25/08* | (2006.01) |
| *B60K 17/04* | (2006.01) |
| *B62D 21/02* | (2006.01) |
| *B60K 1/04* | (2019.01) |

(52) U.S. Cl.
CPC .............. *B62D 21/155* (2013.01); *B60K 1/04* (2013.01); *B60K 17/04* (2013.01); *B62D 21/02* (2013.01); *B62D 25/082* (2013.01); *B60K 2001/0411* (2013.01)

(58) Field of Classification Search
CPC ......... A61P 35/00; A61P 43/00; H04W 72/04; H04W 24/10; H04W 72/042; B32B 27/08; Y02P 40/57; A47C 27/085; F02B 2075/027; Y02E 60/10
See application file for complete search history.

(56) References Cited

U.S. PATENT DOCUMENTS

| | | | |
|---|---|---|---|
| 9,926,017 B1* | 3/2018 | Hamilton | ............... B62D 27/02 |
| 2008/0197672 A1* | 8/2008 | Yamaguchi | .......... B62D 21/152 |
| | | | 296/187.09 |
| 2011/0132676 A1* | 6/2011 | Kodaira | ................. B62D 25/20 |
| | | | 180/65.51 |
| 2011/0316295 A1 | 12/2011 | Yamada et al. | |

(Continued)

FOREIGN PATENT DOCUMENTS

| | | |
|---|---|---|
| CN | 206327313 U | 7/2017 |
| JP | 2006-312437 A | 11/2006 |

(Continued)

*Primary Examiner* — Kiran B Patel
(74) *Attorney, Agent, or Firm* — Dinsmore & Shohl LLP (57) ABSTRACT

A vehicle front portion structure include: side rails that extend in a vehicle longitudinal direction, that have rear end portions connected to a battery; a front side cross member, that is connected to a vehicle front side of both of the side rails and extends in a vehicle transverse direction; and a rear side cross member, extends in the vehicle transverse direction, wherein a front portion of each side rail is positioned further toward a vehicle upper side than a rear portion of the side rail, and an inclined portion, which is inclined toward a vehicle lower side while heading from a vehicle front side toward a vehicle rear side, is provided between the front portion and the rear portion, and wherein a gear box is disposed at a vehicle lower side of the inclined portions, as seen in a vehicle side view.

6 Claims, 8 Drawing Sheets

(56) References Cited

U.S. PATENT DOCUMENTS

| | | | |
|---|---|---|---|
| 2012/0049571 A1* | 3/2012 | Katou | B62D 21/155 |
| | | | 296/187.09 |
| 2013/0119704 A1 | 5/2013 | Amano et al. | |
| 2017/0073014 A1 | 3/2017 | Alwan et al. | |
| 2017/0210218 A1 | 7/2017 | Schmalzrieth et al. | |
| 2018/0312198 A1* | 11/2018 | Shimizu | B60K 1/04 |
| 2018/0361857 A1* | 12/2018 | Shimizu | B60K 6/00 |
| 2018/0370568 A1* | 12/2018 | Ayukawa | B62D 21/02 |
| 2019/0023321 A1* | 1/2019 | Ayukawa | B62D 25/2045 |
| 2019/0031240 A1* | 1/2019 | Uehata | B62D 21/02 |
| 2020/0047696 A1* | 2/2020 | Atsumi | B60R 19/34 |
| 2020/0047811 A1* | 2/2020 | Shimizu | B62D 25/082 |
| 2020/0086926 A1* | 3/2020 | Hashida | B62D 21/03 |
| 2020/0130495 A1* | 4/2020 | Shimizu | B62D 25/2036 |

FOREIGN PATENT DOCUMENTS

| | | |
|---|---|---|
| JP | 2007-216901 A | 8/2007 |
| JP | 2011-152841 A | 8/2011 |
| JP | 4779471 B2 | 9/2011 |
| JP | 2012-006545 A | 1/2012 |
| JP | 2012-045995 A | 3/2012 |
| JP | 2012-106742 A | 6/2012 |
| JP | 2013-103590 A | 5/2013 |
| JP | 2018-187978 A | 11/2018 |

* cited by examiner

VEHICLE FRONT PORTION STRUCTURE

CROSS-REFERENCE TO RELATED APPLICATION

This application claims priority under 35 USC 119 from Japanese Patent Application No. 2018-148344, filed on Aug. 7, 2018, the disclosure of which is incorporated by reference herein.

BACKGROUND

Technical Field

The present disclosure relates to a vehicle front portion structure.

Related Art

Japanese Patent Application Laid-Open (JP-A) No. 2011-152841 discloses a vehicle front portion structure having a motor unit that drives the front wheels, and a battery that supplies electric power to the motor unit. In the vehicle front portion structure disclosed in JP-A No. 2011-152841, the motor unit, which receives collision load at the time of a front collision, is rotated around the drive shaft. Due thereto, the motor unit is moved to beneath the battery, and effects on the space of the vehicle cabin interior are reduced.

By the way, in a structure in which the battery is disposed at the vehicle lower side of the floor panel such as in an electric vehicle or the like, in order to protect the battery at the time of a front collision, impact load must be absorbed effectively at a region that is further toward the vehicle front side than the battery.

SUMMARY

In view of the above-described circumstances, an object of the present disclosure is to provide a vehicle front portion structure that may protect a battery at the time of a front collision.

A first aspect of the present disclosure is a vehicle front portion structure including: side rails that extend in a vehicle longitudinal direction, at vehicle transverse direction outer sides of a vehicle front portion, and that have rear end portions connected to a battery; a front side cross member, that is connected to a vehicle front side of both of the side rails and extends in a vehicle transverse direction; and a rear side cross member, that is connected to a vehicle rear side of both of the side rails and extends in the vehicle transverse direction, wherein a front portion of each side rail is positioned further toward a vehicle upper side than a rear portion of the side rail, and an inclined portion, which is inclined toward a vehicle lower side while heading from a vehicle front side toward a vehicle rear side, is provided between the front portion and the rear portion, and wherein a gear box is disposed at a vehicle lower side of the inclined portions, as seen in a vehicle side view.

In the vehicle front portion structure of the first aspect, the side rails are provided at the vehicle transverse direction outer sides of the vehicle front portion. The side rails extend in the vehicle longitudinal direction, and the rear end portions thereof are connected to a battery. Further, a front side cross member, which extends in the vehicle transverse direction, is connected to the vehicle front sides of the side rails. A rear side cross member, which extends in the vehicle transverse direction, is connected to the vehicle rear sides of the side rails. Here, the front portions of the side rails are positioned further toward the vehicle upper side than the rear portions, and inclined portions are provided between the front portions and the rear portions. The inclined portions are inclined toward the vehicle lower side while heading from the vehicle front side toward the vehicle rear side. Due thereto, at the time of a front collision of the vehicle, due to the front portions of the side rails moving rearward toward the vehicle rear side with respect to the rear portions, the front end sides of the inclined portions deform so as to stand up, and the side rails are folded-over in substantial Z-shapes as seen in a vehicle side view.

Further, the gear box is disposed at the vehicle lower sides of the inclined portions, as seen in a vehicle side view. Due thereto, at the time when the inclined portions of the side rails deform, interference between the inclined portions and the gear box is suppressed, and the collision load is absorbed effectively.

In a second aspect of the present disclosure, in the first aspect, the rear side cross member may be mounted to front side members that extend in the vehicle longitudinal direction further toward the vehicle upper side than the side rails, and the gear box may be mounted to the rear side cross member.

In the vehicle front portion structure of the second aspect, the rear side cross member is mounted to the front side members, and the gear box is mounted to the rear side cross member. Due thereto, at the time of a front collision of the vehicle, the rear side cross member breaks due to the difference in the deformation amounts of the front side members and the side rails. Then, the gear box drops-down from the side rails.

In a third aspect of the present disclosure, in the first aspect or the second aspect, the front portion of each side rail may be positioned further toward a vehicle transverse direction outer side than the rear portion of the side rail, as seen in a plan view, and the inclined portion at each side rail may be inclined toward a vehicle transverse direction inner side while heading from the vehicle front side toward the vehicle rear side.

In the vehicle front portion structure of the third aspect, at the time of a front collision of the vehicle, due to the front portions of the side rails moving rearward toward the vehicle rear side with respect to the rear portions, the inclined portions are deformed so as to collapse in the vehicle transverse direction, as seen in a plan view. Due thereto, the side rails are folded-over in substantial Z-shapes both as seen in a plan view and as seen in a side view.

In a fourth aspect of the present disclosure, in any one of the first aspect through the third aspect, a deformation starting point portion, which is a starting point of bending deformation, is formed at each side rail at an upper portion of a region that is further toward the vehicle rear side than the rear side cross member.

In the vehicle front portion structure of the fourth aspect, after the side rails are folded-over in substantial Z-shapes as seen in a vehicle side view, the portions, which are further toward the vehicle rear side than the rear side cross member, of the side rails are further folded-over in substantial V-shapes with the deformation starting point portions being the starting points.

In a fifth aspect of the present disclosure, in any one of the first aspect through the fourth aspect, a drive shaft may be disposed further toward the vehicle upper side than the inclined portions of each side rail, as seen in a vehicle side view.

In the vehicle front portion structure of the fifth aspect, the gear box is disposed at the vehicle lower sides of the inclined portions, and the drive shaft is disposed at the vehicle upper sides of the inclined portions. Due thereto, as compared with a structure in which the gear box and the drive shaft are disposed so as to be lined-up in the vehicle longitudinal direction, the overhang of the vehicle front portion side (the front overhang) is shorter.

In a sixth aspect of the present disclosure, in any one of the first aspect through the fifth aspect, a power unit may be disposed further toward a vehicle transverse direction inner side than the side rails, and the gear box may be disposed further toward the vehicle front side than the power unit.

In the vehicle front portion structure relating to the sixth aspect, due to the gear box being disposed further toward the vehicle front side than the power unit, the weight of the vehicle front end portion increasing is suppressed, as a compared with a structure in which the power unit is disposed further toward the vehicle front side than the gear box.

BRIEF DESCRIPTION OF THE DRAWINGS

Exemplary embodiments of the present disclosure will be described in detail based on the following figures, wherein.

DETAILED DESCRIPTION

Figure 1:
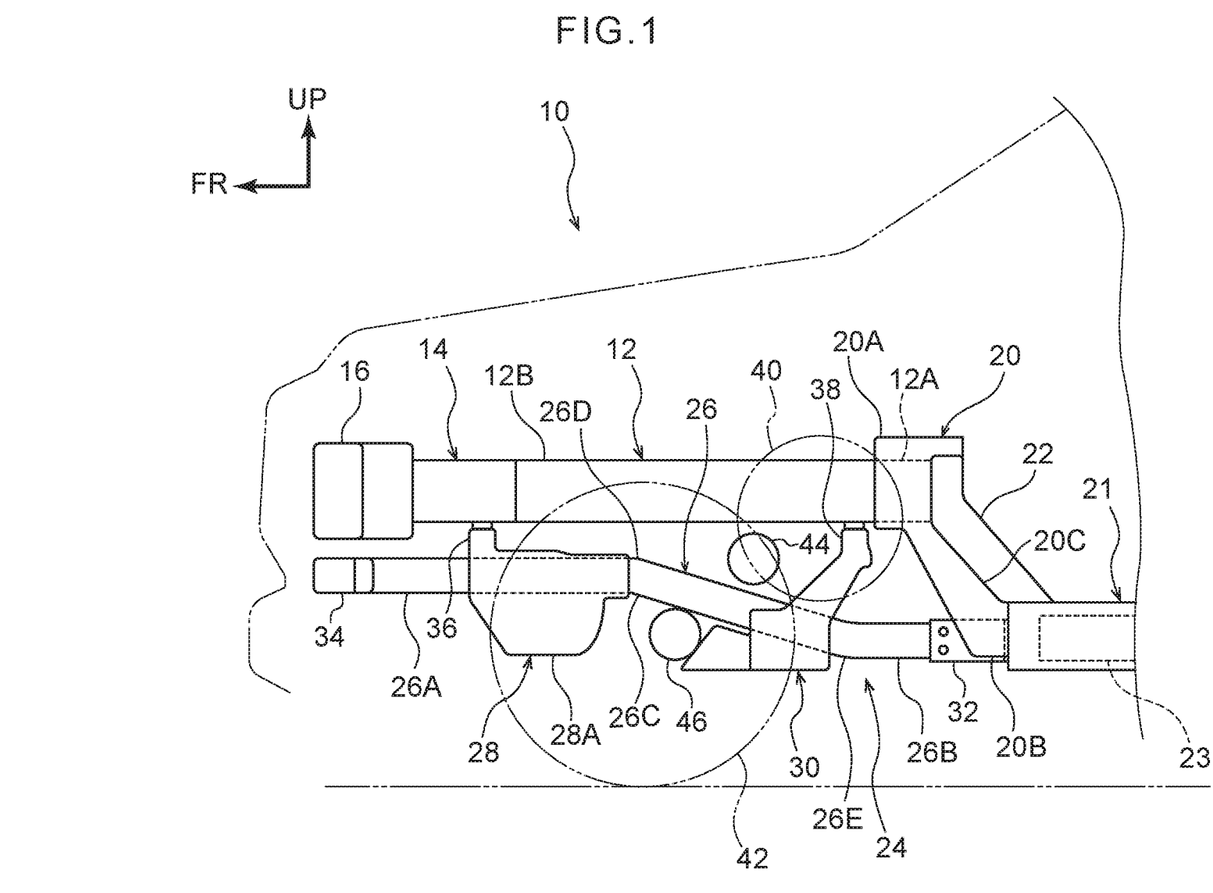
FIG. 1 is a side view of a vehicle front portion structure relating to an exemplary embodiment.

A vehicle front portion structure relating to an embodiment is described with reference to the drawings. As shown in FIG. 1, a pair of left and right front side members 12 are provided at the vehicle front portion of a vehicle 10 to which the vehicle front portion structure is applied. (In FIG. 1, only the front side members 12 that is at the left side of the vehicle is illustrated.)

The front side member 12 extends in the vehicle longitudinal direction at the vehicle transverse direction outer side, and is a frame member having a closed cross-sectional structure. A rear end portion 12A of the front side member 12 is connected to a rear side connecting member 20 that is described later. A front end portion 12B of the front side member 12 is connected to a front side connecting member 14, and is connected to a bumper reinforcement 16 via the front side connecting member 14.

Figure 2:
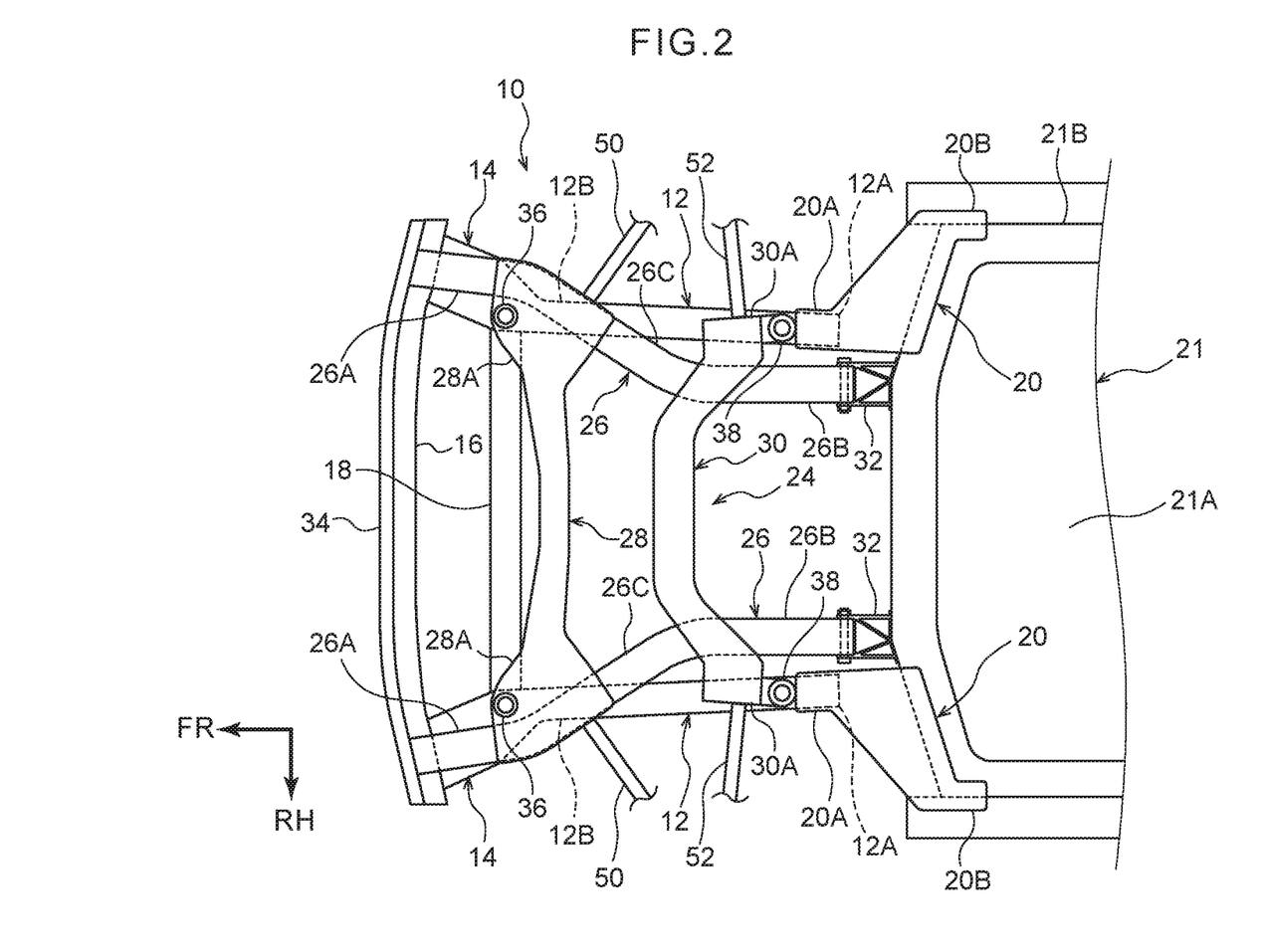
FIG. 2 is a bottom view of the vehicle front portion structure relating to the exemplary embodiment.

As shown in FIG. 2, the front side connecting member 14 is formed by die casting of an aluminum alloy, so as to have a width that is larger than that of the front side member 12. The front side member 12 is mounted to the rear end portion of the front side connecting member 14. Further, a member connecting member 18 is mounted to the vehicle transverse direction inner side surface of the front side connecting member 14.

The member connecting member 18 extends in the vehicle transverse direction, and the both end portions thereof are mounted to the front side connecting members 14, respectively. Therefore, the member connecting member 18 connects the pair of left and right front side members 12 in the vehicle transverse direction via the front side connecting members 14.

The bumper reinforcement 16 is mounted to the front end portions of the front side connecting members 14. The bumper reinforcement 16 is a flame member that extends in the vehicle transverse direction. The front side members 12 are connected to the vehicle transverse direction both end portions of the bumper reinforcement 16 via the front side connecting members 14, respectively. Note that unillustrated apron upper members are connected to the top surfaces of the front side connecting members 14. Namely, the front side members 12, the member connecting member 18, and the apron upper members are connected to the front side connecting members 14 that are formed by die casting.

As shown in FIG. 1, the rear side connecting member 20 is disposed at the vehicle rear side of the front side member 12, and is structured to include an upper side connecting portion 20A, a lower side connecting portion 20B and an inclined portion 20C. The upper side connecting portion 20A structures the upper side of the rear side connecting member 20. The rear end portion 12A of the front side member 12 is connected to this upper side connecting portion 20A. On the other hand, the lower side connecting portion 20B structures the lower side of the rear side connecting member 20. The rear portion of this lower side connecting portion 20B is mounted to a battery case 21.

The inclined portion 20C is the region between the upper side connecting portion 20A and the lower side connecting portion 20B, and is inclined toward the vehicle rear side while heading from the vehicle upper side toward the vehicle lower side. Further, a dash cross member 22 that has a closed cross-sectional structure is connected to the rear surfaces of the inclined portions 20C.

The dash cross member 22 extends in the vehicle transverse direction, and an unillustrated dash panel is mounted to the dash cross member 22. The vehicle cabin inner side, which is at the vehicle rear side, and a power unit chamber, which is at the vehicle front side, are partitioned by the dash panel.

A suspension member 24 is provided at the vehicle lower sides of the front side members 12. As shown in FIG. 2, the suspension member 24 is structured to include a pair of left and right side rails 26, a front side cross member 28 and a rear side cross member 30.

The pair of left and right side rails 26 are respectively formed by extrusion molding of an aluminum alloy, and extend in the vehicle longitudinal direction at the vehicle transverse direction outer sides of the vehicle front portion. Connecting brackets 32 are mounted to the rear end portions of the side rails 26. The rear end portions of the side rails 26 are connected to the battery case 21 via the connecting brackets 32.

A lower bumper reinforcement 34 is provided at the front end portions of the side rails 26. The lower bumper reinforcement 34 is disposed at the vehicle lower side of the bumper reinforcement 16 and extends in the vehicle transverse direction. The front end portions of the side rails 26 are connected to the vehicle transverse direction both end portions of the lower bumper reinforcement 34, respectively.

The front side cross member 28 is formed by die casting of an aluminum alloy, and extends in the vehicle transverse direction. The vehicle transverse direction both end portions of the front side cross member 28 are connected to the vehicle front sides of the side rails 26. Concretely, the vehicle transverse direction both end portions of the front side cross member 28 are made to be enlarged width portions 28A that are formed so as to, as seen in a bottom view, have larger widths than the vehicle transverse direction central portion of the front side cross member 28. Concave portions corresponding to the side rails 26 are formed in the enlarged width portions 28A. The side rails 26 are joined to these concave portions by nuts and bolts or the like in states of being fit in the concave portions. Further, first lower arms 50 are mounted to the front side cross member 28.

As shown in FIG. 1, front side mounting portions 36 are formed at the enlarged width portions 28A of the front side cross member 28. The front side cross member 28 and the front side connecting members 14 are joined vertically at these front side mounting portions 36. Namely, the front side cross member 28 and the front side members 12 are connected via the front side connecting members 14.

As shown in FIG. 2, the rear side cross member 30 is disposed further toward the vehicle rear side than the front side cross member 28. The rear side cross member 30 is formed by die casting of an aluminum alloy, and extends in the vehicle transverse direction. The rear side cross member 30 is disposed at the vehicle lower sides of the side rails 26. Vehicle transverse direction both end portions 30A of the rear side cross member 30 extend further toward the vehicle transverse direction outer sides than the side rails 26. Further, the vehicle transverse direction both end portions of the rear side cross member 30 are joined by nuts and bolts or the like to the side surfaces that are at the vehicle transverse direction outer sides of the side rails 26.

Rear side mounting portions 38 are formed at the rear side cross member 30. As shown in FIG. 1, the rear side cross member 30 extends obliquely toward the vehicle upper side and the vehicle rear side, and the rear side mounting portions 38 are connected to the rear portions of the front side members 12. Moreover, second lower arms 52 are mounted to the rear side cross member 30.

Here, front portions 26A of the side rails 26 are positioned further toward the vehicle upper side than rear portions 26B. Inclined portions 26C are provided at the side rails 26 between the front portions 26A and the rear portions 26B. The inclined portions 26C are inclined toward the vehicle lower side while heading from the vehicle front side toward the vehicle rear side.

Concretely, the front portion 26A of the side rail 26 extends in the vehicle longitudinal direction along the front side member 12 as seen in a vehicle side view. In the present embodiment, as an example, the front portion 26A is disposed further toward the vehicle upper side than the battery case 21. On the other hand, the rear portion 26B of the side rail 26 extends in the vehicle longitudinal direction at the height of the battery case 21. A first bent portion 26D is provided between the front portion 26A and the inclined portion 26C, and a second bent portion 26E is provided between the rear portion 26B and the inclined portion 26C.

As shown in FIG. 2, at the side rail 26, as seen in a plan view (as seen in a bottom view), the front portion 26A is positioned further toward the vehicle transverse direction outer side than the rear portion 26B. The inclined portion 26C at the side rail 26 is inclined toward the vehicle transverse direction inner side while heading from the vehicle front side toward the vehicle rear side.

As shown in FIG. 1, a motor 40 that serves as a power unit is disposed at the vehicle front portion. Due to the motor 40 receiving a supply of electric power from a battery 23, which is accommodated within the battery case 21, and being driven, the motor 40 rotates front wheels 42. A drive shaft 44 is provided in a vicinity of the motor 40. As seen in a vehicle side view, the drive shaft 44 is disposed at the vehicle upper side of the inclined portions 26C of the side rails 26.

On the other hand, a gear box 46 is disposed further toward the vehicle front side and the vehicle lower side than the motor 40. Here, the gear box 46 is disposed at the vehicle lower sides of the inclined portions 26C of the side rails 26 as seen in a vehicle side view, and is mounted to and supported by the rear side cross member 30. Therefore, the drive shaft 44 and the gear box 46 are disposed such that the inclined portions 26C are disposed therebetween as seen in a vehicle side view.

As shown in FIG. 2, the battery case 21 is structured to include a bottom plate 21A and a battery frame portion 21B. The bottom plate 21A is a plate-shaped member that structures the bottom portion of the battery case 21, and extends to the vehicle rear portion.

The battery frame portion 21B is formed in the shape of a frame so as to surround the bottom plate 21A as seen in a plan view (as seen in a bottom view), and has a flat cross-sectional structure. Namely, the cross-section, when the region that extends in the vehicle longitudinal direction of the battery frame portion 21B is seen from the vehicle longitudinal direction, is a closed cross-section, and the cross-section, when the region that extends in the vehicle transverse direction of the battery frame portion 21B is seen from the vehicle transverse direction, is a closed cross-section.

(Operation)

Operation of the present embodiment is described next.

In the vehicle front portion structure of the present embodiment, as shown in FIG. 1 and FIG. 2, the rear end portions of the side rails 26 are connected to the battery 23 (the battery case 21). Due thereto, at the time of a front collision of the vehicle 10, some of the collision load that is inputted to the side rails 26 may be borne by the battery 23 (the battery case 21)

Further, due to the side rails 26 being formed in curved shapes as seen in a vehicle side view and as seen in a plan view (as seen in a bottom view), collision load may be absorbed effectively at further toward the vehicle front side than the battery 23. This operation is described with reference to FIG. 3 through FIG. 7. Note that, for convenience of explanation, in FIG. 3 through FIG. 7, main portions of the vehicle 10 are shown schematically, and illustration of some parts is omitted.

Figure 3A:
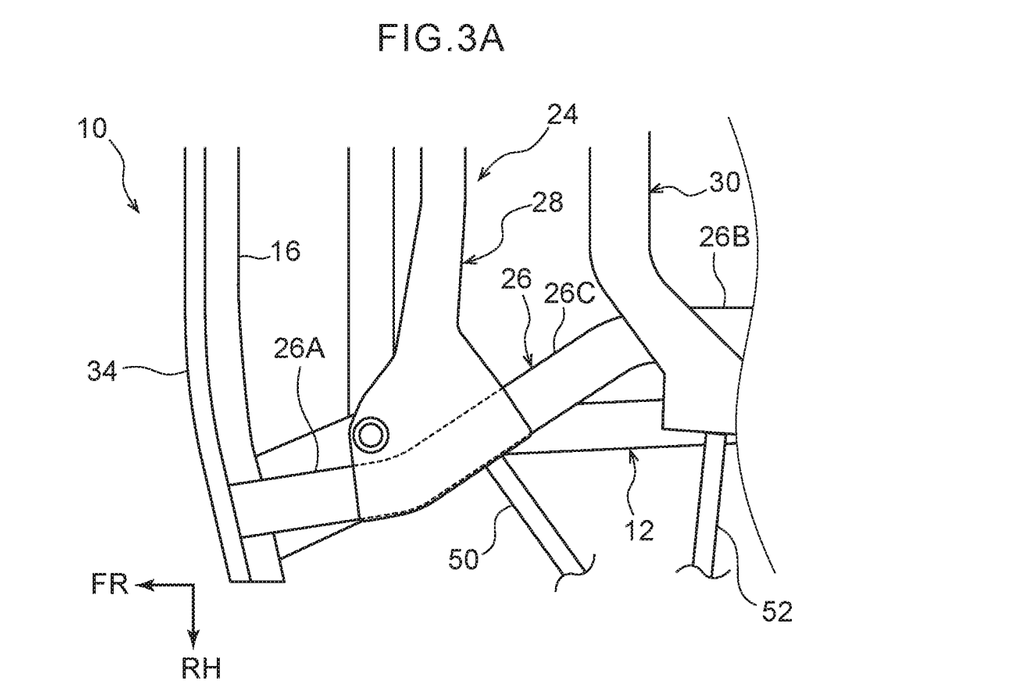
FIG. 3A is an enlarged view of FIG. 2 in a state before a front collision.
Figure 3B:
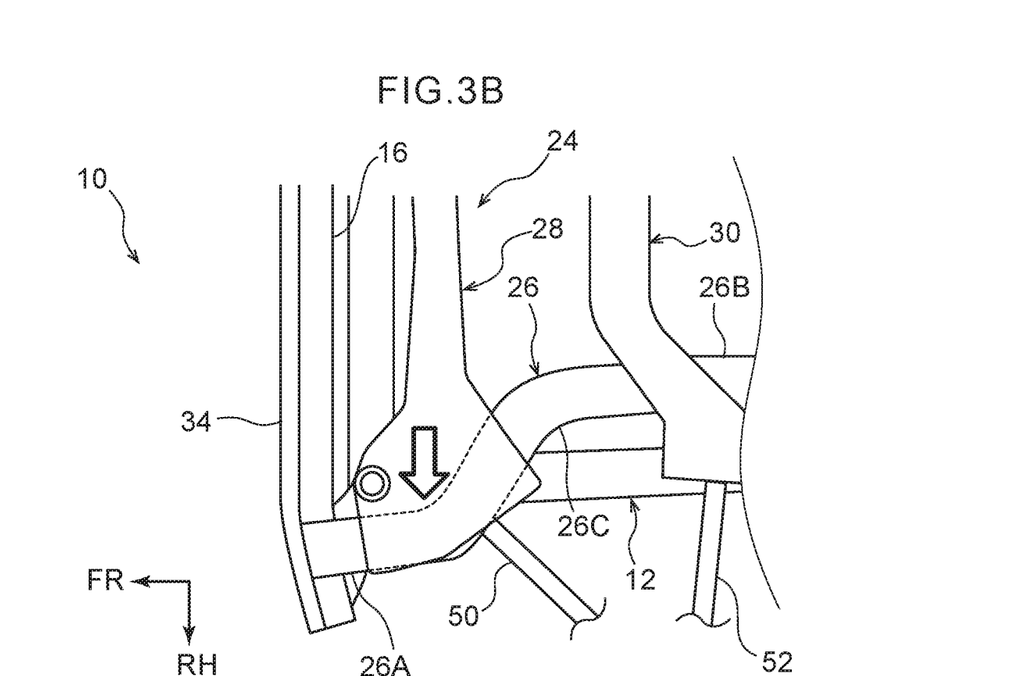
FIG. 3B is an enlarged view of FIG. 2 in the state of the initial stage of a collision.

At the vehicle 10 shown in FIG. 3A, in a state that is in the initial stage of a collision at the time of a front collision, as shown in FIG. 3B, due to a barrier (not illustrated) colliding with the bumper reinforcement 16 and the lower reinforcement 34, the front side member 12 is crushed. Accompanying this, the bumper reinforcement 16 and the lower bumper reinforcement 34 move toward the vehicle rear side. Due thereto, as shown by the arrow in the drawing, the angle of inclination of the inclined portion 26C at the side rail 26 becomes large, and the front portion 26A folds-over so as to be positioned further toward the vehicle transverse direction outer side, with respect to the rear portion 26B.

Figure 4A:
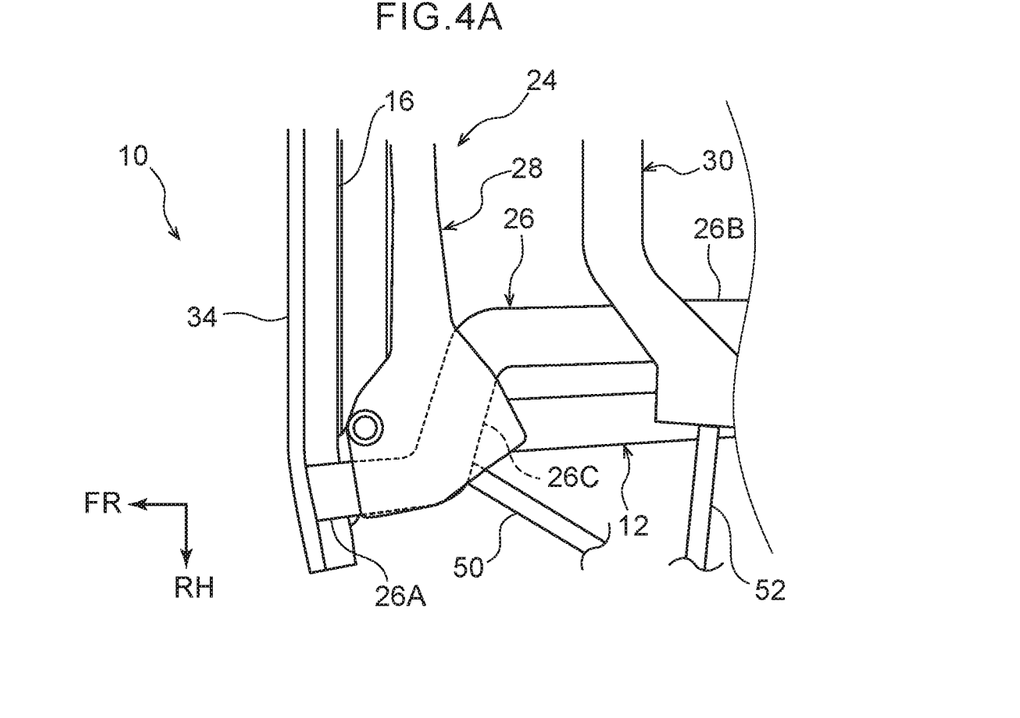
FIG. 4A is a drawing showing a situation in which the collision has progressed from the state of FIG. 3B.
Figure 4B:
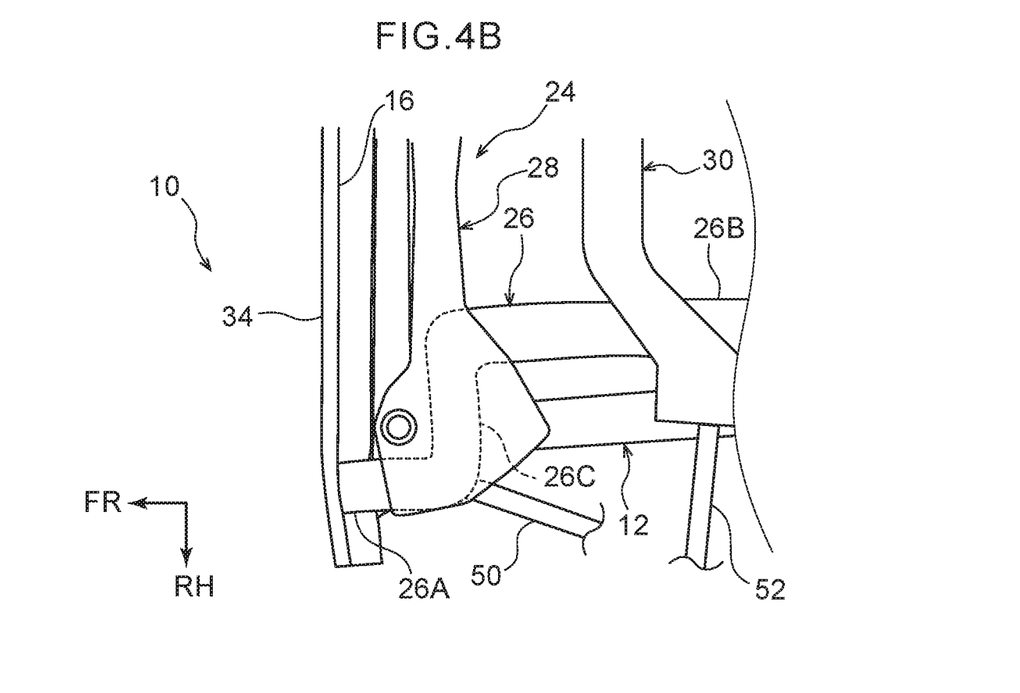
FIG. 4B is a drawing showing a situation in which the collision has progressed from the state of FIG. 4A.

When the collision progresses further from the state of FIG. 3B, the state shown in FIG. 4A arises. Namely, the angle of inclination of the inclined portion 26C at the side rail 26 becomes larger. Then, due to the collision progressing further, as shown in FIG. 4B, the side rail 26 is folded-over such that the inclined portion 26C collapses in the vehicle transverse direction. In this way, at the time of a front collision, due to the front portion 26A of the side rail 26 moving rearward toward the vehicle rear side with respect to the rear portion 26B, as seen in a plan view (as seen in a bottom view), the inclined portion 26C is deformed so as to collapse in the vehicle transverse direction, and the side rail 26 may be folded-over in a substantial Z-shape. As a result, as compared with a structure in which the side rail 26 is formed to be rectilinear as seen in a plan view (as seen in a bottom view), the side rail 26 may effectively and stably be folded over at the time of a front collision.

Further, in the present embodiment, the side rail 26 is made to be a curved shaped as seen in a side view as well. Therefore, as shown in FIG. 5, in the initial stage of a collision, due to the front portion 26A of the side rail 26 moving rearward toward the vehicle rear side with respect to the rear portion 26B, the region between the front portion 26A and the inclined portion 26C deforms so as to bulge-out toward the vehicle upper side.

Figure 5:
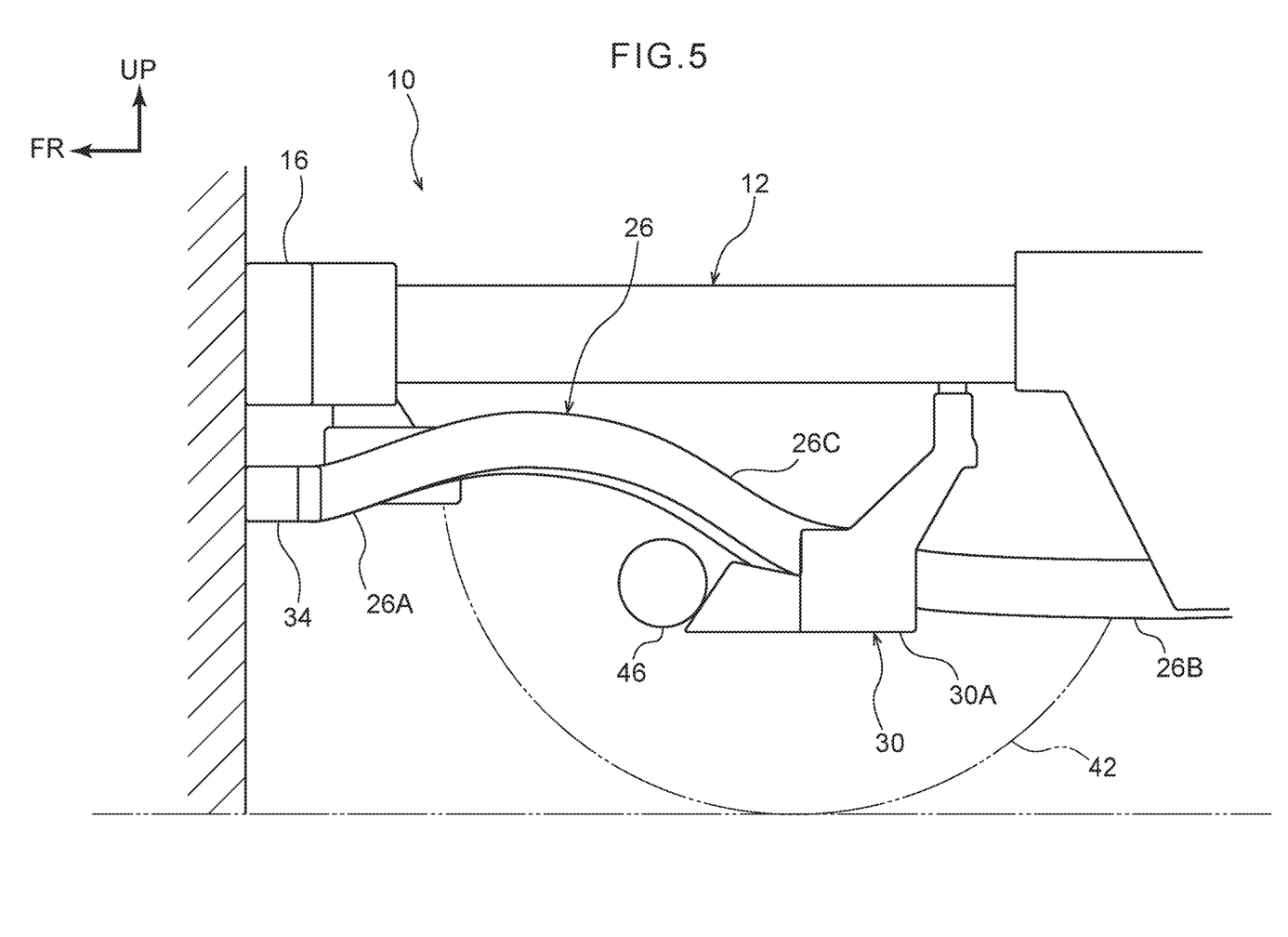
FIG. 5 is an enlarged view of FIG. 1 in the state of FIG. 3B.
Figure 6:
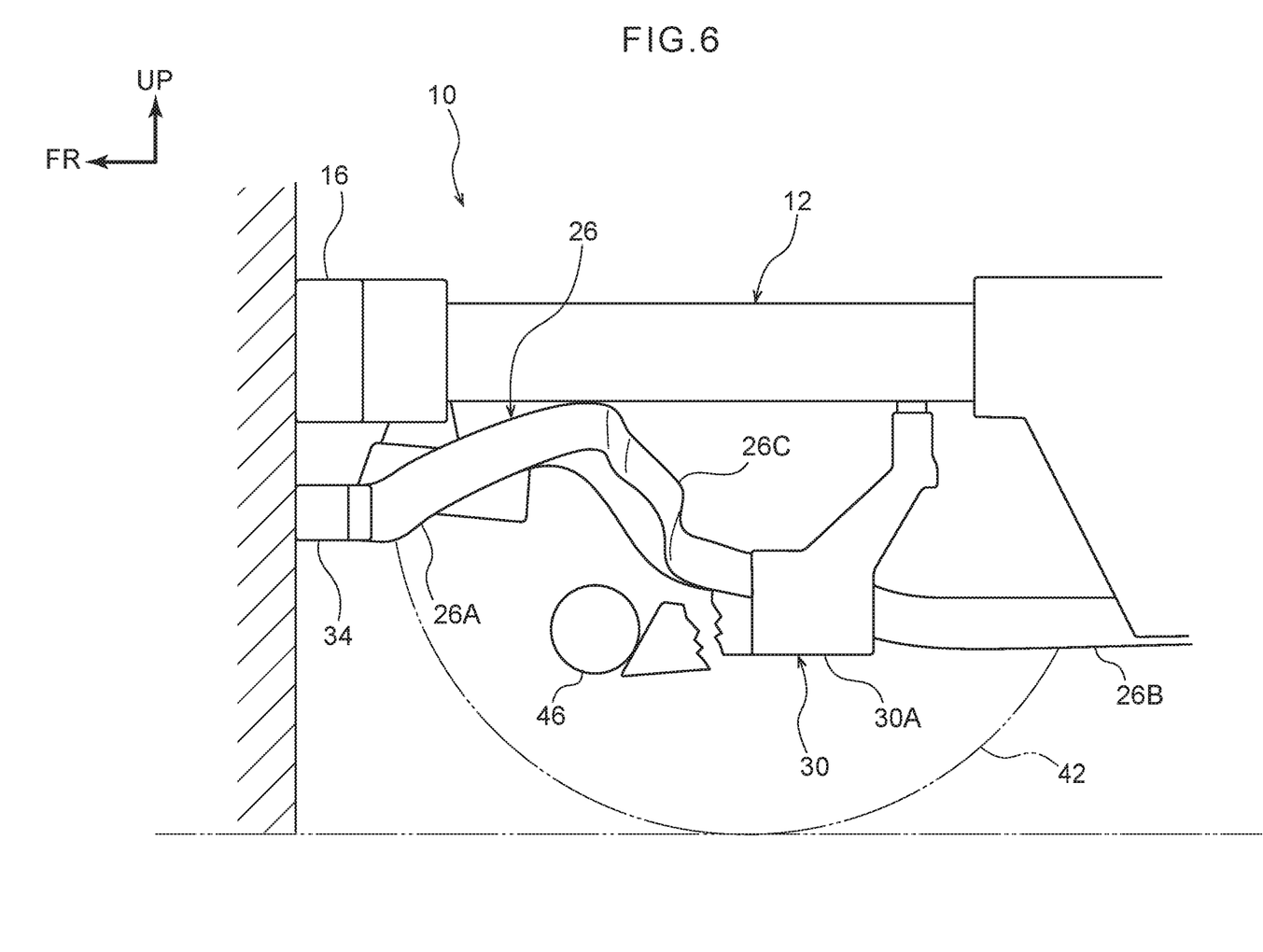
FIG. 6 is an enlarged view of FIG. 1 in the state of FIG. 4A.
Figure 7:
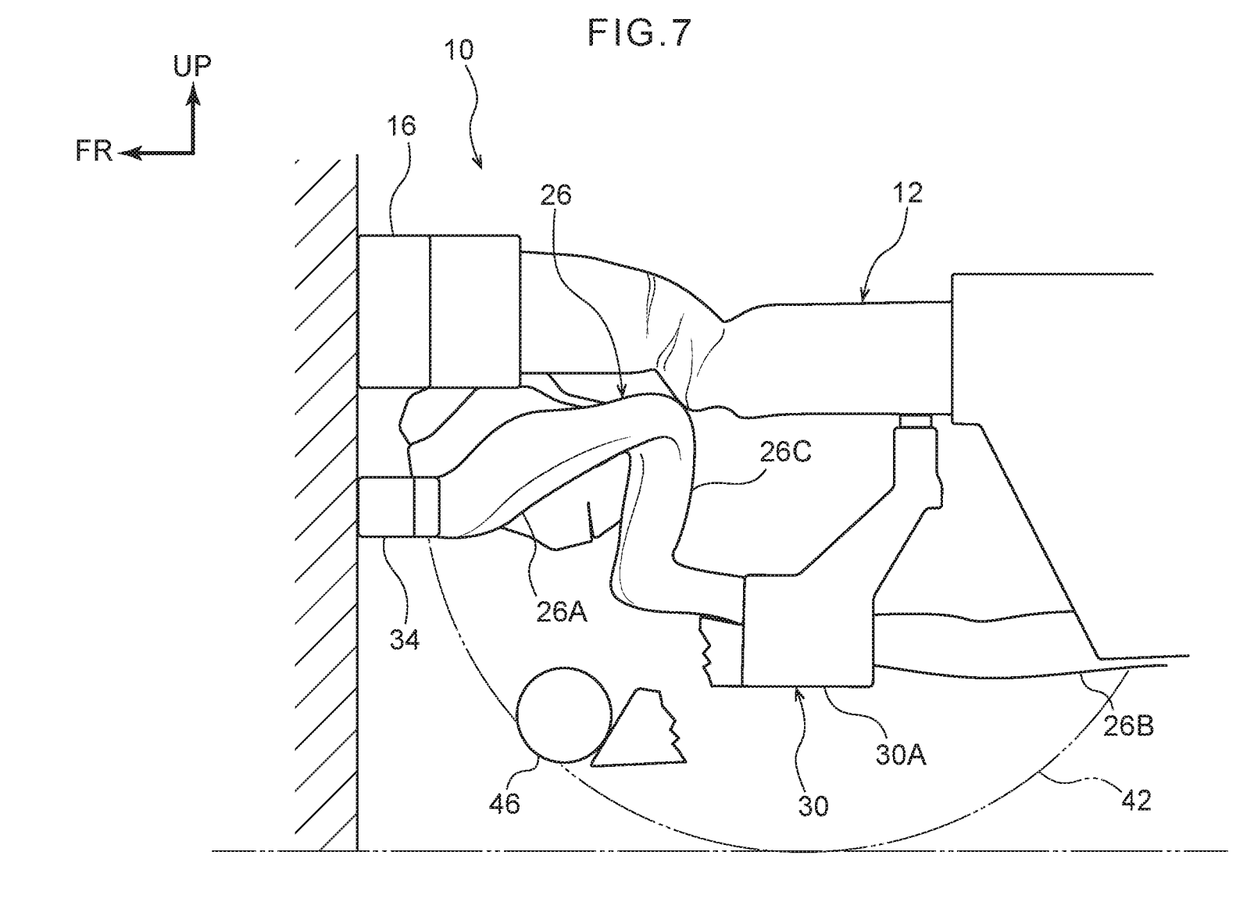
FIG. 7 is an enlarged view of FIG. 1 in the state of FIG. 4B.

When the collision progresses further from the state of FIG. 5, as shown in FIG. 6, the angle of inclination of the inclined portion 26C become larger, and moreover, as shown in FIG. 7, as seen in a vehicle side view, the front end side of the inclined portion 26C deforms so as to stand up, and the side rail 26 is folded-over in a substantial Z-shape. Namely, the side rail 26 is folded-over in a substantial Z-shape as seen in both a plan view (a bottom view) and a vehicle side view. Further, at this time, because the gear box 46 is disposed at the vehicle lower side of the inclined portion 26C, the inclined portion 26C that deforms and the gear box 46 interfering with one another may be suppressed, and the inclined portion 26C being crushed incompletely (a so-called dead stroke arising) due to the gear box 46 may be suppressed. Namely, the collision load may be absorbed effectively, and the battery 23 may be protected at the time of a front collision.

Here, in the present embodiment, as shown in FIG. 5, in particular, the rear side cross member 30 is mounted to the front side members 12, and the gear box 46 is mounted to the rear side cross member 30 and is supported by the rear side cross member 30. Due thereto, at the time of a front collision of the vehicle 10, due to the differences in the deformation amounts of the front side members 12 and the side rails 26, the rear side cross member 30 is broken as shown in FIG. 6. Thereafter, as shown in FIG. 7, the gear box 46 may be made to drop-down from the side rails 26. Due thereto, the occurrence of a dead stroke due to the gear box 46 may be suppressed reliably. Further, due to the gear box 46 falling-down from the side rails 26, an intermediate shaft (not illustrated) that is connected to the gear box 46 moving toward the vehicle rear side may be suppressed. As a result, the steering wheel moving toward the driver may be suppressed.

Moreover, in the present embodiment, as shown in FIG. 1, the gear box 46 is disposed at the vehicle lower side, and the drive shaft 44 is disposed at the vehicle upper side, with the inclined portions 26C of the side rails 26 disposed therebetween. Due thereto, as compared with a structure in which the gear box 46 and the drive shaft 44 are disposed so as to be lined-up in the vehicle longitudinal direction, the overhang at the vehicle front portion side (the front overhang) may be shortened. Namely, in a case in which both the gear box 46 and the drive shaft 44 are disposed at the vehicle upper side of the inclined portions 26C, space for placing the gear box 46 and the drive shaft 44 such that they are lined-up in the vehicle longitudinal direction is needed, and it is difficult to make the front overhang short. In contrast, by employing the structure of the present embodiment, the front overhang may be shortened, and the space at the vehicle cabin interior may be ensured to be wide.

Still further, in the present embodiment, the gear box 46 is disposed further toward the vehicle front side than the motor 40. Due thereto, the weight of the vehicle front end portion increasing may be suppressed, as compared with a structure in which the motor 40 is disposed further toward the vehicle front side than the gear box 46. As a result, the steering stability may be improved as compared with a structure in which the motor 40 is disposed further toward the vehicle front side than the gear box 46.

Note that, in the present embodiment, deformation starting point portions for folding the side rails 26 over reliably, or the like, are not provided. However, as in the modified example of FIG. 8, beads 54 that serve as deformation starting point portions may be formed at the rear portions of the side rails 26.

Modified Example

Figure 8:
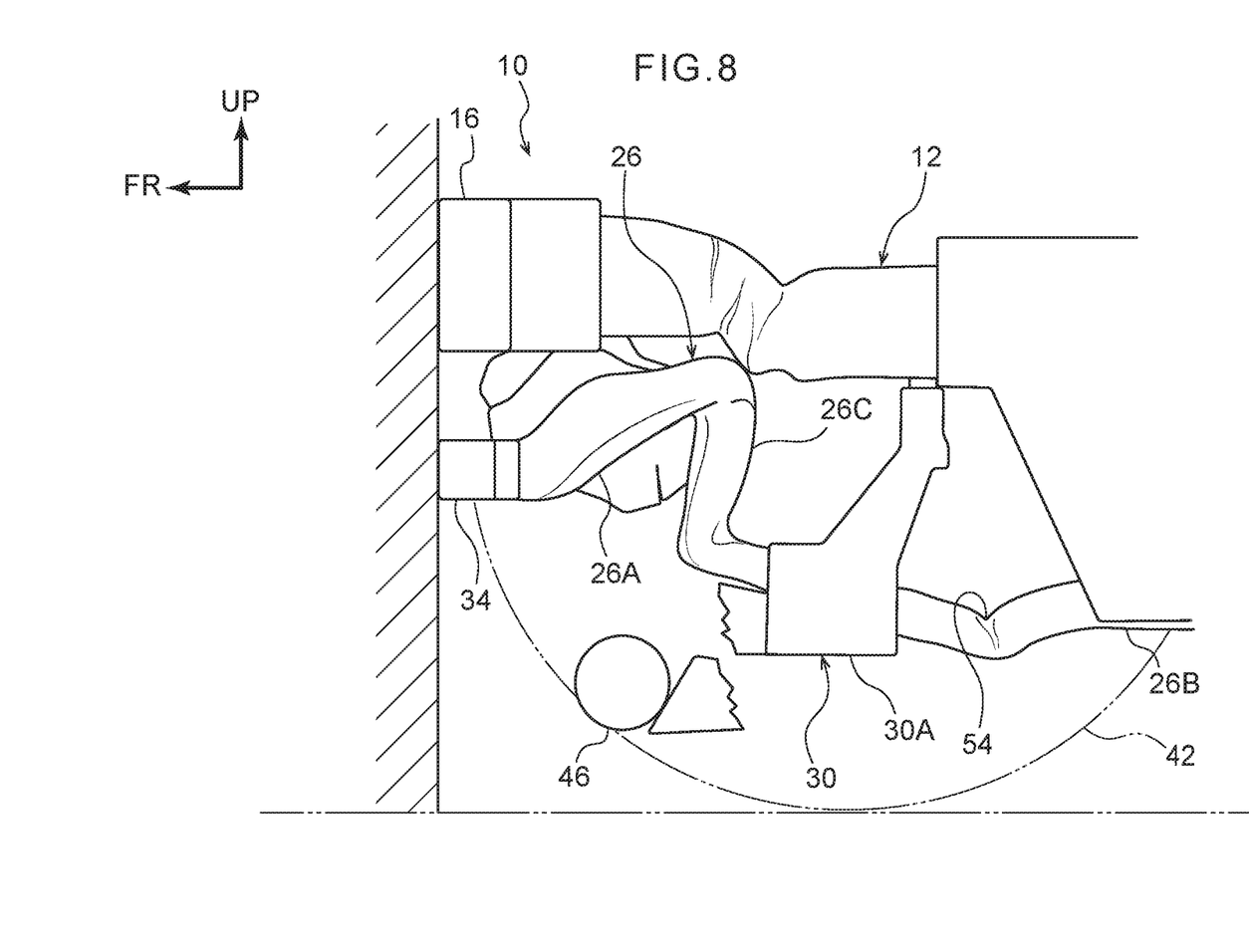
FIG. 8 is a drawing that corresponds to FIG. 7 and shows a modified example of the vehicle front portion structure relating to the exemplary embodiment.

As shown in FIG. 8, in the present modified example, the beads 54 are formed in advance at the rear portions of the side rails 26, in the state before a collision. These beads are concave beads that are formed at the top surfaces of the side rails 26, in order to become starting points of bending deformation at the time of a front collision, and extend in the vehicle transverse direction.

In the vehicle 10 to which the present modified example is applied, after the side rails 26 have been folded-over in substantial Z-shapes as seen in a vehicle side view, the portions, which are further toward the vehicle rear side than the rear side cross member 30, of the side rails 26 may be further folded-over in substantial V-shapes with the beads 54, which serve as the deformation starting point portions, being the starting points. Due thereto, the impact absorption performance may be improved. Note that, even if the beads 54 are not formed, it is possible for the side rails 26 to be folded-over in substantial V-shapes. However, by forming deformation starting point portions such as the beads 54 or the like, the side rails 26 may be folded-over into substantial V-shapes more reliably, and a high robust deformation mode may be realized.

Although an embodiment and a modified example have been described above, the present disclosure may, of course, be implemented in various forms within a scope that does not depart from the gist thereof. For example, in the above-described embodiment, the front side cross member 28 and the rear side cross member 30 are formed by die casting aluminum alloys, but the present disclosure is not limited to this, and extrusion molded parts or press molded parts or the like may be used.

Further, in the above-described embodiment, the side rails 26 are formed so as to be folded-over into substantial Z-shapes as seen in both a vehicle side view and a plan view (bottom view). However, the present disclosure is not limited to this. For example, there may be a structure in which the side rails 26 extend substantially rectilinearly in the vehicle longitudinal direction as seen in a plan view. However, in order to fold the side rails 26 over reliably and absorb the collision load at the time of a front collision, the structure of the present embodiment is employed.

What is claimed is:

1. A vehicle front portion structure, comprising:
   side rails that extend in a vehicle longitudinal direction, at vehicle transverse direction outer sides of a vehicle front portion, and that have rear end portions connected to a battery;
   a front side cross member, that is connected to a vehicle front side of both of the side rails and extends in a vehicle transverse direction; and
   a rear side cross member, that is connected to a vehicle rear side of both of the side rails and extends in the vehicle transverse direction,
   wherein a front portion of each side rail is positioned further toward a vehicle upper side than a rear portion of the side rail, and an inclined portion, which is inclined toward a vehicle lower side while heading from a vehicle front side toward a vehicle rear side, is provided between the front portion and the rear portion, and
   wherein a gear box is disposed at a vehicle lower side of the inclined portions, as seen in a vehicle side view.

2. The vehicle front portion structure of claim 1, wherein:
   the rear side cross member is mounted to front side members that extend in the vehicle longitudinal direction further toward the vehicle upper side than the side rails, and
   the gear box is mounted to the rear side cross member.

3. The vehicle front portion structure of claim 1, wherein:
   the front portion of each side rail is positioned further toward a vehicle transverse direction outer side than the rear portion of the side rail, as seen in a plan view, and
   the inclined portion at each side rail is inclined toward a vehicle transverse direction inner side while heading from the vehicle front side toward the vehicle rear side.

4. The vehicle front portion structure of claim 1, wherein a deformation starting point portion, which is a starting point of bending deformation, is formed at each side rail at an upper portion of a region that is further toward the vehicle rear side than the rear side cross member.

5. The vehicle front portion structure of claim 1, wherein a drive shaft is disposed further toward the vehicle upper side than the inclined portion of each side rail, as seen in a vehicle side view.

6. The vehicle front portion structure of claim 1, wherein:
   a power unit is disposed further toward a vehicle transverse direction inner side than the side rails, and
   the gear box is disposed further toward the vehicle front side than the power unit.

* * * * *